(12) United States Patent
Markov et al.

(10) Patent No.: US 10,175,102 B2
(45) Date of Patent: Jan. 8, 2019

(54) METHOD AND APPARATUS FOR BEACONLESS ADAPTIVE OPTICS SYSTEM

(71) Applicant: Advanced Systems & Technologies, Inc., Irvine, CA (US)

(72) Inventors: Vladimir Markov, Irvine, CA (US); Anatoliy Khizhnyak, Irvine, CA (US)

(73) Assignee: ADVANCED SYSTEMS & TECHNOLOGIES, INC., Irvine, CA (US)

(*) Notice: Subject to any disclaimer, the term of this patent is extended or adjusted under 35 U.S.C. 154(b) by 82 days.

(21) Appl. No.: 15/166,101

(22) Filed: May 26, 2016

(65) Prior Publication Data

US 2016/0349110 A1 Dec. 1, 2016

Related U.S. Application Data

(60) Provisional application No. 62/166,576, filed on May 26, 2015.

(51) Int. Cl.
  *G01J 1/42* (2006.01)
  *G01J 9/00* (2006.01)
  *G01J 1/04* (2006.01)

(52) U.S. Cl.
  CPC .......... *G01J 1/4228* (2013.01); *G01J 1/0411* (2013.01); *G01J 1/0437* (2013.01); *G01J 9/00* (2013.01)

(58) Field of Classification Search
  CPC ............ G01J 1/0437; G01J 9/00; G02B 27/46
  See application file for complete search history.

(56) References Cited

U.S. PATENT DOCUMENTS

| | | | | |
|---|---|---|---|---|
| 4,645,347 A * | 2/1987 | Rioux | ................... | G01C 11/00 250/208.1 |
| 5,148,323 A * | 9/1992 | Campbell | .............. | G02B 27/46 359/558 |
| 6,264,328 B1 * | 7/2001 | Williams | .................. | G01J 9/00 351/221 |
| 2004/0151008 A1 * | 8/2004 | Artsyukhovich | ... | A61F 9/00817 362/572 |
| 2012/0057020 A1 * | 3/2012 | Kobayashi | ............... | G01C 3/08 348/135 |
| 2014/0184748 A1 * | 7/2014 | Gharib | ............... | H04N 13/0246 348/46 |

OTHER PUBLICATIONS

Michael C. Roggemann and Byron Welsh; "*Imaging Through Turbulence*", CRC Press, Jan. 18, 1996; pp. 169-243; (39 pages).

(Continued)

*Primary Examiner* — Thanh Luu
(74) *Attorney, Agent, or Firm* — Snell & Wilmer LLP

(57) ABSTRACT

A system for forming virtual beacons usable in wavefront sensing includes a first lens configured to receive light from a target and to output an image towards an input plane. The system also includes a selector positioned at the input plane. The selector includes a transparent portion that allows a portion of the image output by the first lens to pass through the selector to form a virtual beacon. The selector also includes a translucent portion to prevent another portion of the image output by the first lens from passing through the selector.

20 Claims, 11 Drawing Sheets

(56) References Cited

OTHER PUBLICATIONS

Larry C. Andrews and Ronald L. Phillips; "*Laser Beam Propagation Through Random Media*", Second Edition, SPIE Press, Sep. 16, 2005; pp. 533-605; (38 pages).
Mikhail A. Vorontsov and Valeriy Kolosov; "*Target-in-the-loop beam control: basic considerations for analysis and wave front sensing*", Journal of the Optical Society of America, vol. 22, No. 1, Jan. 2005; (16 pages).
Piotr Piatrou and Michael Roggemann; "*Beaconless stochastic parallel gradient descent laser beam control: numerical experiments*", Journal of the Optical Society of America, vol. 46, No. 27, Sep. 20, 2007; (12 pages).
John W. Hardy; "*Adaptive Optics for Astronomical Telescopes*", Oxford University Press, 1998; pp. 308-376; (36 pages).

\* cited by examiner

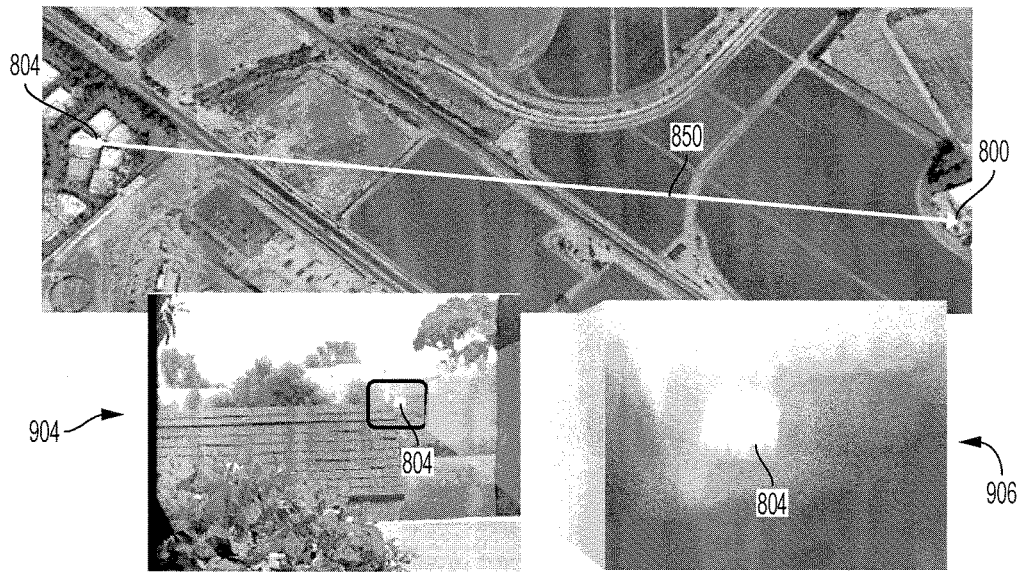
FIG. 9A
FIG. 9B
FIG. 9C
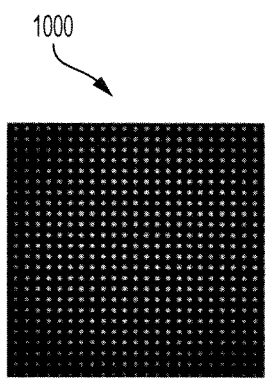
FIG. 10A
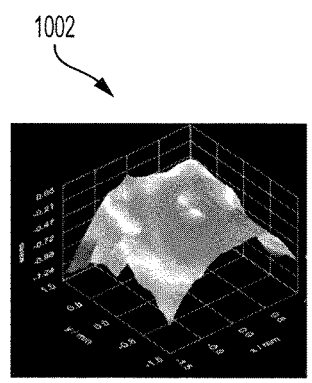
FIG. 10B
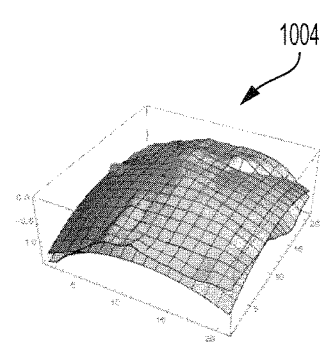
FIG. 10C

METHOD AND APPARATUS FOR BEACONLESS ADAPTIVE OPTICS SYSTEM

CLAIM OF PRIORITY UNDER 35 U.S.C. § 119(e)

This application claims the benefit and priority of U.S. Provisional Patent Application No. 62/166,576, entitled "METHOD AND APPARATUS FOR BEACONLESS ADAPTIVE OPTICS SYSTEM," filed on May 26, 2015, the entire contents of which is hereby incorporated by reference herein.

STATEMENT REGARDING GOVERNMENT RIGHTS

This invention was made with Government support under Contract No. FA9453-14-C-0036, awarded by the United States Air Force, and Contract No. N68335-14-C-0377, awarded by the United States Office of Naval Research. The Government has certain rights in this invention.

BACKGROUND

1. Field of the Invention

The present invention relates generally to optics and more particularly, to systems and methods for adaptive optics without use of a beacon at a target.

2. Description of the Related Art

When light travels through the atmosphere, atmospheric turbulence may perturb the amplitude and phase of the propagating light wave(s). Thus, when an output light beam with a relatively well defined intensity pattern (diameter) and wavefront propagates through the perturbed atmosphere, the atmosphere may cause distortions of the beam. These distortions may result in the cross-section of the beam being less defined, and making the wavefront spatially non-uniform. Adaptive optical systems attempt to measure distortions of the wavefront resulting from atmospheric perturbations and to adjust incoming or outgoing light waves by compensating for the wavefront distortions.

Adaptive optics may be used in a variety of fashions. For example, adaptive optics may be used in laser systems to increase a density of laser beam power to such that the density remains relatively high when received at a desired location on a target or a receiver. Adaptive optics may also be used in imaging systems to improve a quality of a detected image and to increase a resolution of an image taken by a receiver.

Conventional adaptive optics system includes the use of a relatively small beacon positioned at or in a vicinity of the target. Light from the beacon is received at the location of the adaptive optics system and is analyzed to determine any changes to the light caused by turbulence in the atmosphere. In some cases, it may be undesirable or difficult to place a beacon at a target. Thus, it is desirable to be able to quantify the distortions of the light wavefronts caused by atmospheric disturbance without use of a localized beacon positioned at the target.

SUMMARY OF THE INVENTION

Described herein is a system for forming virtual beacons usable in wavefront sensing. In particular, the system may be used for adaptive optics for adjusting a spot size of a laser beam focused on the target, for increasing image quality and/or image resolution, and/or for detecting a distance to a target. The system includes a first lens designed to receive light from a target (i.e., light that is reflected by or scattered off of a surface of the target) and to form an image towards an image plane. The system also includes a selector positioned at the image plane. The selector includes a transparent portion that allows a portion of the image output by the first lens to pass through the selector to form a virtual beacon. The selector also includes a translucent portion to prevent another portion of the image output by the first lens from passing through the selector.

Also described is a method for forming a virtual beacon usable in a wavefront sensing system for adaptive optics purposes. The method includes receiving, by a first lens, light from a target. The method also includes forming, by the first lens, an image at the input plane. The method also includes allowing, by a transparent portion of a selector, a portion of the image output by the first lens to pass through the selector. The method also includes preventing, by a translucent portion of the selector, another portion of the image output by the first lens from passing through the selector.

Also described is a system for forming virtual beacons usable in wavefront sensing for use in adaptive optics. The system includes an imaging optic including at least one lens positioned a first distance from a target. The imaging optic has a focal length and is designed to receive light from the target and to output an image towards an image plane. The system also includes a filter positioned a second distance from the imaging optic. The filter includes a translucent portion that defines an aperture to allow a portion of the image output by the imaging optic to pass through the filter to form a virtual beacon.

BRIEF DESCRIPTION OF THE DRAWINGS

Other systems, methods, features and advantages of the present invention will be or will become apparent to one of ordinary skill in the art upon examination of the following figures and detailed descriptions. It is intended that all such additional apparatuses, systems, methods, features and advantages be included within this description, be within the scope of the present invention, and be protected by the appended claims. Component parts shown in the drawings are not necessarily to scale, and may be exaggerated to better illustrate the important features of the present invention. In the drawings, like reference numerals designate like parts throughout the different views, wherein:

FIG. 9A is a picture of a map illustrating a birds eye view of a location of the system and the target of FIG. 8 according to an embodiment of the present invention;

FIG. 9B is a picture illustrating a view of the target of FIG. 8 from the system of FIG. 8 according to an embodiment of the present invention;

FIG. 9C is a picture illustrating an enlarged view of the target of FIG. 8 from the system of FIG. 8 according to an embodiment of the present invention;

FIG. 10A is a graph illustrating the intensity of the virtual beacon of FIG. 8 detected by a Shack-Hartmann wavefront sensor according to an embodiment of the present invention;

FIG. 10B is a graph illustrating a wavefront of light waves corresponding to the virtual beacon of FIG. 8 calculated using the intensity of the virtual beacon shown in FIG. 10A according to an embodiment of the present invention;

FIG. 10C is a graph illustrating a spherical component of the wavefront of FIG. 10B used to determine the distance from the system to the target of FIG. 8 according to an embodiment of the present invention;

DETAILED DESCRIPTION

The present disclosure is directed to systems and methods for generating and using virtual beacons in adaptive optics, such as for use in wavefront sensing. The present systems and methods may be used, for example, to increase a resolution of images of a target, to increase light energy of a laser beam received at a desired location on a target, and to detect a distance to a target without use of a local beacon at the target.

When light from a source, such as a laser or the sun, contacts a target, the light reflects or scatters from the target and may scatter in various directions. When this scattered light is received at a given plane, the lights at any point along a plane may be received from multiple locations of the target due to this scattering. Thus, any wavefront received at the plane may include multiple wavefronts of waves scattered from various areas of the target. It may be difficult to determine the wave perturbations caused by the atmosphere by analyzing such a combination of wavefronts.

Figure 1A:
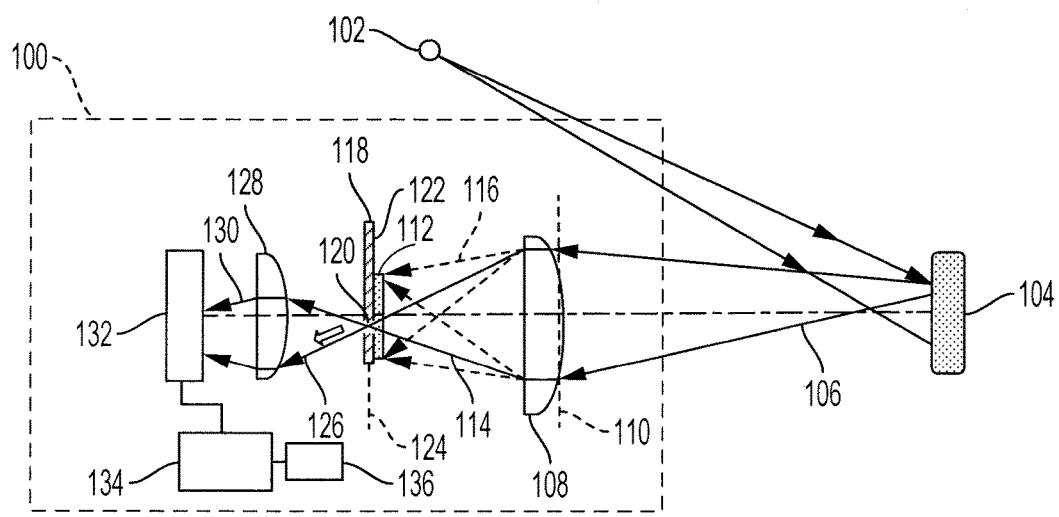
FIG. 1A is a schematic diagram illustrating features of a system for forming and using a virtual beacon for adaptive optics purposes according to an embodiment of the present invention.

Referring to FIG. 1A, a system 100 may be used for generating a virtual beacon based on light scattered or reflected by a surface of a target (i.e., light from the target). The virtual beacon may be used for adaptive optics in a similar manner as a localized beacon placed at the target.

In particular, a light source 102 may generate light that is received at a target 104. The light source 102 may include any light source such as a laser, the sun, the moon, a light source that generates light invisible to the human eye, or the like. The light from the light source 102 may be scattered from the surface of the target 104 and travel towards the system 100 as light 106.

The system 100 may include a first lens, or imaging optic, 108 positioned at a pupil plane 110. The imaging optic 108 may include one or more lenses for focusing, filtering, or otherwise adjusting features of the light 106. After focusing or filtering the light, the imaging optic 108 may output an image 112 towards an image plane 124.

A selector 118 may be positioned at the image plane 124. The selector 118 may include a transparent portion 120 and a translucent portion 122. The transparent portion 120 may include an aperture defined by the translucent portion 122. In some embodiments, the transparent portion 120 may have any shape such as circular, triangular, square, or the like. In some embodiments, a diameter or other distance of the transparent portion 120 may be adjustable. For example, an actuator may be coupled to the selector 118 and may adjust the size of the transparent portion 120 based on user input and/or based on feedback from a controller 136 or processor. For example, the controller 136 may include a diaphragm controller configured to adjust the size of the transparent portion 120 based on analyzed wavefront data. In some embodiments, a user may be able to physically manipulate the selector 118 to adjust the size of the transparent portion 120. In some embodiments, the transparent portion 120 may include a transparent material such as a fluid, a solid, or a gas, instead of or in addition to being an aperture. The translucent portion 122 may include any structure that prevents at least some light from passing through the selector 118.

When the image 112 reaches the selector 118, a first portion 114 of the image 112 is allowed to pass through the transparent portion 120 of the selector 118 and a second portion 116 of the image 112 is prevented from passing through the selector 118 due to the translucent portion 122. Thus, the selector 118 may be referred to as a filter because it allows some light to pass and prevents some light from passing. Use of the selector 118 in this manner enables selection of a portion of the image 112 that corresponds to a desired location on the target, such as a location at which a laser beam will be directed. For example, the selector 118 may be used to select the first portion 114, and the first portion 114 may correspond to a desired location on the target 104. The first portion 114 of the image 112 that passes through the selector 118 may be used to form a wave-field of a virtual beacon 126.

The virtual beacon 126 may have similar light wave characteristics as light received from a beacon positioned at the desired location of the target 104. In that regard, the virtual beacon 126 may provide complete wavefront information that may be used in an adaptive optics system just as if a physical beacon was positioned at the target 104. In particular, the wavefront information provided from the virtual beacon 126 may be used to determine the effect of turbulence in the atmosphere between the system 100 and the target 104 on light waves.

Figure 1B:
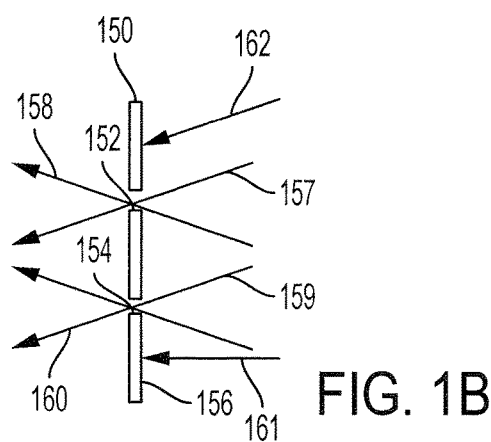
FIG. 1B is a schematic diagram illustrating a selector for use in the system of FIG. 1A for forming two virtual beacons for adaptive optics purposes according to an embodiment of the present invention.

In some embodiments, more than one virtual beacon may be desired. Referring to FIG. 1B, a selector 150 may be provided having a first transparent portion 152, a second transparent portion 154, and a translucent portion 156. An image 162 may be directed towards the selector 150. As the image 162 reaches the selector 150, a first portion 157 of the image 162 may pass through the first transparent portion 152, a second portion 159 of the image 162 may pass through the second transparent portion 154, and a third portion 161 of the image 162 may be prevented from passing through the selector 150 due to interference by the translucent portion 156. The first portion 157 of the image 162 that passes through the first transparent portion 152 of the selector 150 may be used as a first virtual beacon 158, and the second portion 159 of the image 162 that passes through the second transparent portion 154 of the selector 150 may be used as a second virtual beacon 160.

Returning to FIG. 1A, the system 100 may include a second lens, or optical object, 128 positioned in such a way as to receive the virtual beacon 126. The optical object 128 may include one or more lenses for focusing, filtering, or otherwise adjusting features of the virtual beacon 126. For example, the optical object 128 may receive the virtual beacon 126 and may convert the virtual beacon 126 to light waves 130 that resemble the light 106 from the target 104. However, because the second portion 116 of the image 112 was prevented from passing to the optical object 128 by the translucent portion 122 of the selector 118, the light waves 130 resemble only the portion of the light 106 from the desired location on the target 104.

After the optical object 128 has converted the virtual beacon 126 to the light waves 130 that resemble the light 106 scattered from the target 104, the light waves 130 may be received by a wavefront sensor 132. The wavefront sensor 132 may include any sensor capable of detecting data corresponding to features of the light waves 130, such as a wavefront structure, the curvature of the total wavefront, any changes to the wavefront over a period of time, and/or other parameters that characterize turbulence between the target 104 and the system 100. In some embodiments, the wavefront sensor 132 may include a Shack-Hartmann wavefront sensor or an interferometer.

The system 100 may also include a wavefront processor 134 coupled to the wavefront sensor 132. The wavefront processor 134 may be included as part of a computing system or device and be capable of analyzing wavefront data detected by the wavefront sensor 132. For example, the wavefront processor 134 may analyze the wavefront data and may determine characteristics of the atmosphere between the system 100 and the target 104 based on the analysis of the wavefront data. In that regard, specific characteristics of the turbulence of the atmosphere may be determined by the wavefront processor 134 by analyzing the wavefront data.

The system 100 may also include a controller 136 such as a mirror controller for controlling a deformable mirror or a laser controller for controlling a laser or a deformable mirror. The controller 136 may receive the characteristics of the atmosphere between the system 100 and the target 104 as analyzed by the wavefront processor 134. The controller 136 may control a deformable mirror for transmission of a laser beam or for receipt of image data from the target 104 to increase resolution of the image data or to decrease a radius of a laser beam received at a desired portion of the target 104.

Figure 1C:
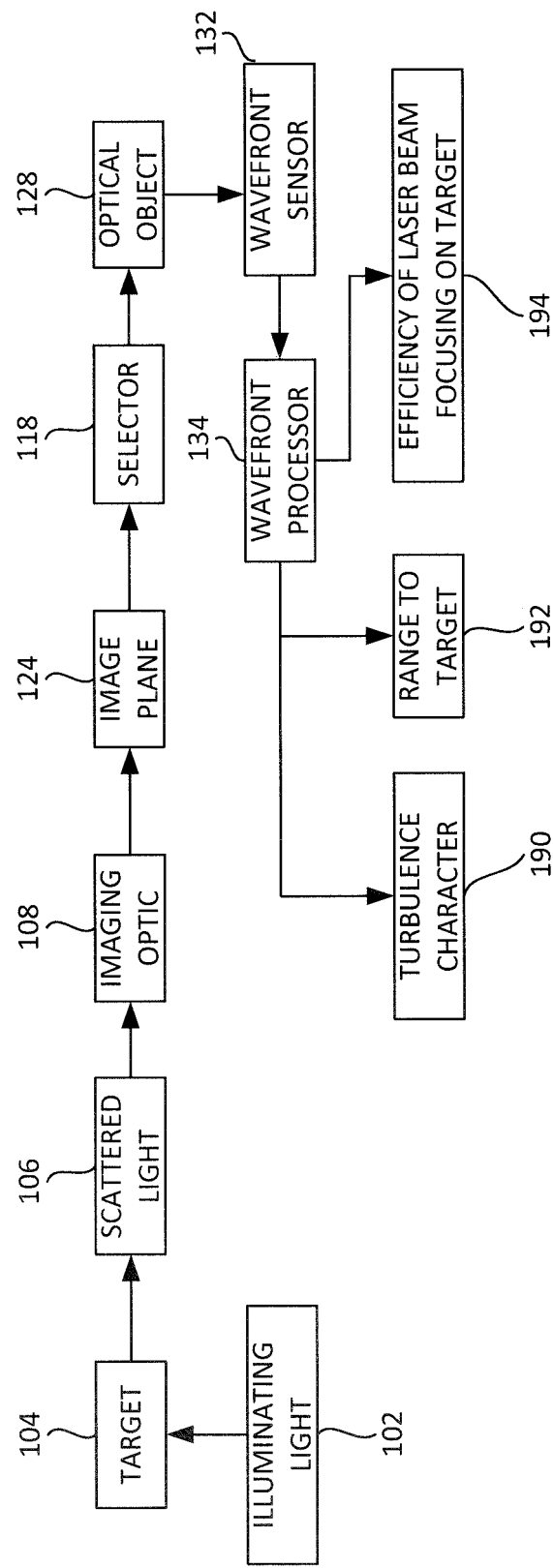
FIG. 1C is a block diagram illustrating an algorithm for turbulence characterization, range finding, and estimation of laser beam focusing efficiency using the system of FIG. 1A according to an embodiment of the present invention.

Referring to FIGS. 1A and 1C, an algorithm 189 for characterizing atmospheric turbulence between the system 100 and the target 104 is shown. Light from the light source 102 is received at the target 104 and may illuminate the target 104. This light scatters off of a surface of the target 104 and is transmitted as light 106 towards the system 100. The scattered light 106 is received by the imaging optic 108. The imaging optic 108 focuses the light as an image 112 towards the image plane 124.

The selector 118 is used to select a portion of the image 112 to be allowed to pass through the selector 118. The portion of the image allowed to pass through the selector 118 is referred to as the virtual beacon 126. The virtual beacon 126 is received by the optical object 128 where it is focused towards the wavefront sensor 132 for detection of features of the wavefront.

The wavefront processor 134 receives the detected wavefront features from the wavefront sensor 132. The wavefront processor 132 analyzes the detected wavefront features and can use the analysis to characterize one or more aspects of the system 100. For example, the wavefront processor 132 can determine one or more characteristics of the turbulence 190 between the system 100 and the target 104 based on the wavefront analysis. As another example, the wavefront processor 132 can determine a range 192 to the target 104 from the system 100 based on the wavefront analysis. As yet another example, the wavefront processor 132 can determine an efficiency of a laser beam that is focused on the target 104 based on the wavefront analysis.

Figure 2:
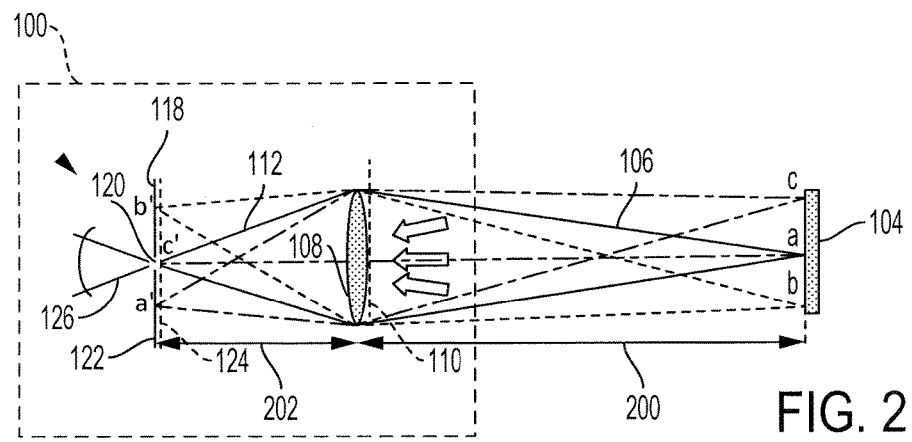
FIG. 2 is a schematic diagram illustrating operation of a portion of the system of FIG. 1 according to an embodiment of the present invention.

Turning now to FIG. 2, performance of the imaging optic 108 is described. As shown, the imaging optic 108 focuses or directs the light 106 from the target 104 to a position on the image plane 124 as the image 112. The features of the image correspond to features of the light from the target. For example, light waves denoted by the letter c are reflected or scattered by a first end of the target 104, light waves denoted by the letter b are reflected or scattered by a second end of the target 104, and light waves denoted by the letter a are reflected or scattered from a center of the target 104.

The image 112 is received as an inverse image of the target 104. In particular, light waves denoted by c', which correspond to the light waves denoted by the letter c, are received at a first end of the selector 108. Light waves denoted by b', which correspond to the light waves denoted by the letter b, are received at a second end of the selector 108. Light waves denoted by a', which correspond to the light waves denoted by the letter a, are received at a middle of the selector 108.

The transparent portion 120 of the selector 118 is positioned at the middle of the selector 108 in order to receive light waves that correspond to the middle of the target 104. Thus, the virtual beacon 126 that passes through the transparent portion 120 may be used as if it were light from a beacon positioned at a point of interest on the target 104. If data corresponding to the atmosphere between another portion of the target 104, such as the first end, and the system 100 is desired, the transparent portion 120 may be moved to another location along the selector 118, such as to the first end of the selector 118.

A first distance 200 may exist between the target 104 and the imaging optic 108. A second distance 202 may exist between the selector 118 and the imaging optic 108. The focal length of the imaging optic 108 may be represented by equation 1 below where F represents the focal length of the imaging optic 108, L represents the first distance 200, and r represents the second distance 202:

$$1/F = 1/L + 1/r. \quad \text{(eq. 1)}$$

Figure 3:
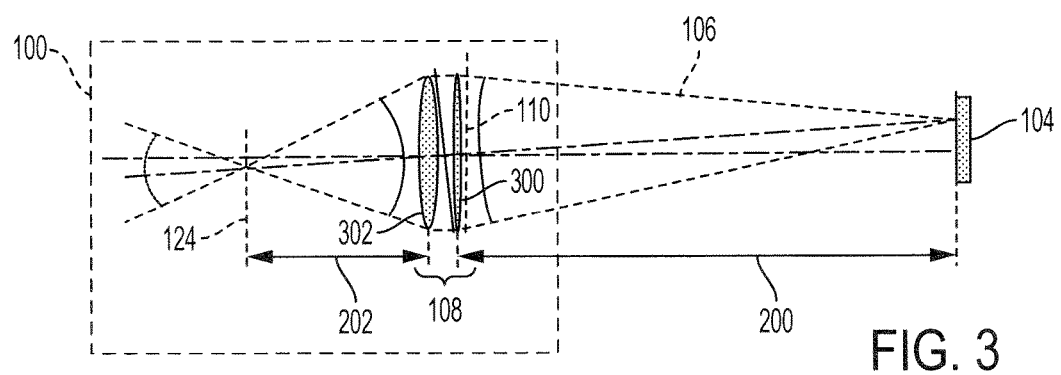
FIG. 3 is a schematic diagram illustrating features of an imaging optic of the system of FIG. 1 according to an embodiment of the present invention.

Turning now to FIG. 3, it is shown that the imaging optic 108 may be represented as a sum of a first partial lens 300 and a second partial lens 302. The first partial lens 300 is focused towards the target 104 and has a first focus length equal to the first distance 200, and the second partial lens 302 is focused towards the image plane 124 and has a second focal length equal to the second distance 202.

The light waves having spherical aspects and that are received from the target 104 may be transformed into a plane wave by the first partial lens 300 and then focused towards the image plane 124 by the second partial lens 302. The first partial lens 300 may thus have a focus towards the target 104 and the second partial lens 302 may have a focus towards the image plane 124.

Further performance of the system 100 is explained with reference to FIG. 4. To restore the structure of the waves of the light 106 from the target 104, the virtual beacon 126 is passed through the optical object 128. The optical object 128 is positioned a distance 400 from the selector 118. The distance 400 may be equal to the sum of the focal length of the imaging optic 110 and the optical object 128. The wavefront of the light waves of the light 106 received at the imaging optic 108 may have a curvature with a radius equal to the first distance 200. The sag of this wavefront may be equal to the difference of the phase shift at the pupil plane 110 on the axis of the wavefront and the edge of the wavefront. In particular, equation 2 below describes the value $\Delta\Phi$ of the sag of the wavefront:

$$\Delta\Phi = \pi \cdot D^2/(2 \cdot \lambda \cdot L) = \pi \cdot N_{Fr}/2 \quad \text{(eq. 2)}$$

In equation 2, D corresponds to a diameter 401 of the imaging optic 108, L corresponds to the distance 200, and $N_{Fr} = D^2/(\lambda \cdot L)$ is the Fresnel number calculated for the diameter 401 of the imaging optic 108 based on the distance 200. The value of $N_{Fr}$ defines the imaging resolution of the system 100. In particular, the resolved scale on the target 104 is equal to $\eta = D/N_{Fr}$, where the parameter $\eta$ determines the minimal size of the laser beam focused on the target 104 by the imaging optic 108 when propagating in a vacuum.

In the case where the image resolved extended target $N_{Fr}$ is much greater than one, the sag of the wavefront satisfies the relationship $\Delta\Phi \gg \pi$. Strong wavefront variations such as these may complicate measurements and characterizations of the turbulence-induced wavefront perturbations. Thus, exclusion of these variations enables a substantial increase in the accuracy of the detected wavefront variations caused by turbulence along the propagation range.

As described above, the spherical wave is transformed by the optical object 128 to resemble the light 106 from the target 104. In paraxial approximation, the amplitude u(x, y) of the wave propagating through the optical object 128 is described by equation 3 shown below:

$$u(x_2, y_2) = \frac{\exp[ik(L_0 + D \cdot (x_2^2 + y_2^2)/2B)]}{i\lambda B} \quad \text{(eq. 3)}$$

$$\int_{(S_1)} u(x_1, y_1) \cdot \exp\left[\frac{i\pi}{\lambda B}\{A \cdot (x_1^2 + y_1^2) - 2(x_1 x_2 + y_1 y_2)\}\right] dS_1,$$

where variables $\{x_1, y_1\}$ describe a start plane on a surface of the target 104 and variables $\{x_2, y_2\}$ describe the final plane of wave propagation, $k = 2\pi/\lambda$. $S_1$ corresponds to an area of the start plane of the target 104. $L_0$ is the total distance between start and final plane. For example, $L_0$ corresponds to a sum of the distance 200, the distance 202, and the distance 400. The ratios A/B, D/B, and 1/B correspond to the path from the target 104 to the optical object 128. L corresponds to the distance 200, r corresponds to the distance 202, R corresponds to the distance 400, and f corresponds to the focal length of the optical object 128 to satisfy equation 4 below:

$$\frac{A}{B} = \frac{r^2 + (r+L) \cdot R}{L^2 \cdot R}, \frac{D}{B} = -\frac{(R-f)}{R \cdot f}; \frac{1}{B} = -\frac{r}{L \cdot R}. \quad \text{(eq. 4)}$$

In equation 3 above, we can assume that $u(x_1, y_1) = \delta(x_0, y_0)$, where $\{x_0, y_0\}$ are coordinates of the spherical way from the start point on the surface of the target 104. Thus, equation 3 can be solved by the following equation 5:

$$u(x_2, y_2) = \frac{u(x_0, y_0) \cdot \exp[ik(L_0 + A \cdot (x_0^2 + y_0^2)/2 \cdot B)]}{i\lambda B} \cdot \quad \text{(eq. 5)}$$

$$\exp\left[\frac{i\pi}{\lambda B}\{D \cdot (x_2^2 + y_2^2) - 2(x_0 \cdot x_2 + y_0 \cdot y_2)\}\right].$$

This solution shows that the wave output by the optical object 128 has a curvature that can be determined based on a ratio D/B along with a direction of propagation by a starting position on the surface of the target 104 {x0, y0}. If the optical object 128 is in a position where the distance 400 is equal to the focal length of the optical object 128, then D=0 and the wavefront of the wave doesn't have curvature (i.e., the wavefront is planar). Therefore, the location of the optical object 128 at the distance 400 from the image plane 124 provides for exclusion of the beginning curvature of the partial spherical wave.

The tilt angle of the partial wave propagation output by the optical object 128, θx,y, satisfies the relationship θx,y=A tan [(x0,y0)·r/(L·R)]≅(x0,y0)·r/(L·R) and is determined by displacement of the spherical wave starting position from the optical axis, the range of the wave, and the telescope magnification ratio K=r/R.

If the atmosphere between the target 104 and the pupil plane 110 is turbulent, the spherical waves corresponding to the light 106 received at the pupil plane 110 by the imaging optic 108 include wavefront perturbations. With reference to FIGS. 3 and 4, the light 106 between the first partial lens 300 and the second partial lens 302 is transformed into a plurality of plane waves. Each of these plane waves propagates through the second partial lens 302 and the optical object 128. The propagation of these waves through the second partial lens 302 and the optical object 128 may be described by equation 6 below:

$$u(x_2, y_2) = -\frac{u(\theta_x, \theta_y)}{R/r} \cdot \exp\left[ik(R+r) \cdot \left(1 + \frac{r}{2R} \cdot (\theta_x^2 + \theta_y^2)\right)\right] \cdot \exp\left[\frac{i \cdot k \cdot r}{R} \cdot (x_2 \cdot \theta_x + y_2 \cdot \theta_y)\right]. \quad \text{(eq. 6)}$$

It follows from equation 6 that any plane wave that has an altered direction of propagation is reproduced and output by the optical object 128. The direction of propagation of this wave may be determined by the magnification $K_T$=r/R of a telescope. Therefore, the components of the system 100 shown in FIG. 4 allows for restoration of the wave field of the waves of the light 106 from the target 104. Use of the system 100 allows the curvature of the wavefront of these waves to be excluded. This curvature is associated with the scattering of the waves of the light 106 from a rough surface of the target 104.

Returning reference to FIG. 1, the waves that are restored by the optical object 128 are directed to the wavefront sensor 132, analyzed by the wavefront processor 134, and transmitted to the controller 136 for control of components of the system 100. In particular, the controller 136 may be a diaphragm controller and thus coupled to the selector 118. The selector 118 may include one or more actuators for adjusting the location and/or size of the transparent portion 120. In that regard, the controller 136 may control the location and/or size of the transparent portion 122 to select an area of interest on the target 104 from which the virtual beacon 126 may be formed. Likewise, the controller 136 may control the size of the transparent portion 122 to optimize the quality of the beacon 126. In some embodiments, a user may provide input to the controller to adjust the location and/or size of the transparent portion 120 and/or may manually adjust the location and/or size of the transparent portion 120.

Referring back to FIGS. 1A and 1B, use of the selector 150 having multiple transparent portions 152, 154 allows selection of multiple areas of the target 104 for forming virtual beacons 158, 160. Since each of the virtual beacons 158, 160 originate from different areas on the target 104, the waves may incur different wavefront perturbations based on varying turbulence in different regions of the atmosphere. By comparing the perturbations, specific parameters of the turbulence, such as isoplanatic conditions, of the atmosphere between the imaging optic 108 and the target 104 can be determined. This information can be used to determine the applicability of various adaptive optics techniques for correcting perturbations and achieving the desired effect.

Figure 5A:
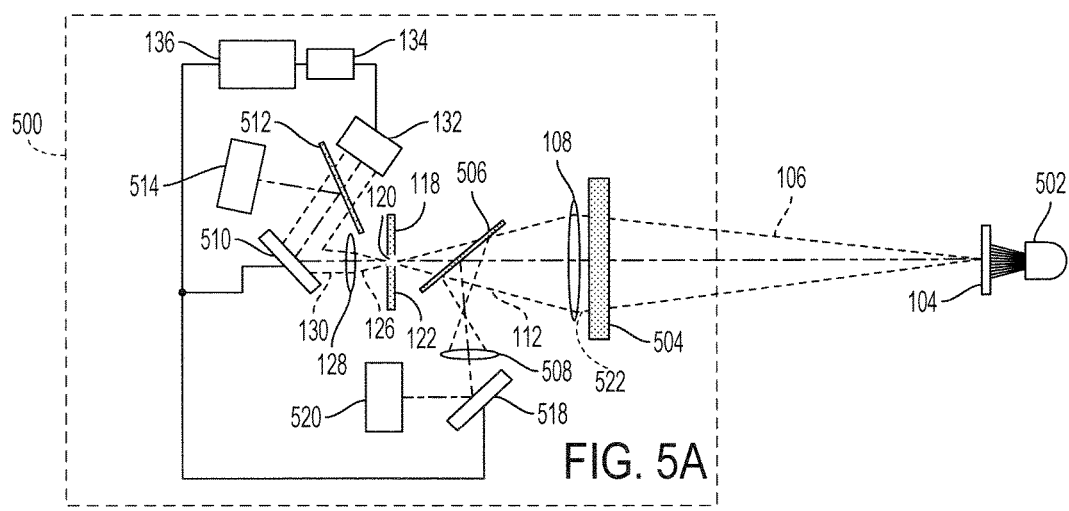
FIG. 5A is a schematic diagram illustrating features of a system for forming a virtual beacon and using the virtual beacon to increase image resolution of image data corresponding to light reflected or scattered from a surface of a target according to an embodiment of the present invention.

Turning now to FIG. 5A, a system 500 for detecting image data of the target 104 at a relatively high resolution by using the virtual beacon 126 is shown. The system 500 includes many components of the system 100 of FIG. 1A. An LED 502 is positioned behind the target 104 for illuminating the target 104 with incoherent light. A random screen 504 is positioned between the target 104 and the imaging optic 108 for simulating atmospheric turbulence.

A first beam splitter 506 is positioned between the imaging optic 108 and the selector 118 and transmits a portion or a copy of the image 112 towards a lens 508 and a deformable mirror 518. The lens 508 focuses the portion or copy of the image 112 towards the deformable mirror 518. The deformable mirror 518 may reflect the image 112 towards the camera 520. The deformable mirror 518 can be controlled to have varying characteristics to compensate for the turbulence simulated by the random screen 504. In that regard, the adjustable characteristics may be used to scatter the reflected light in a desired fashion.

Another deformable mirror 510 may receive the light waves 130 output by the optical object 128. The deformable mirror 510 may also be controlled by the controller 136 to adjust characteristics of the light waves 130 upon reflection. The light waves 130 scattered and reflected by the deformable mirror 510 may pass through a second beam splitter 512 which allows a portion or a copy of the light waves 130 to pass to the wavefront sensor 132 and another portion or copy of the light waves 130 to pass to another camera 514.

Due to the positioning of the camera 520 and the camera 514, the camera 514 will receive only a selected portion of the light 106 from the target 104 while the camera 520 may receive all of the light 106 from the target 104. The selected portion of the light 106 received by the camera 514 corresponds to the virtual beacon 126.

As with the system 100 of FIG. 1, the wavefront sensor 132 receives the light waves 130 that resemble the light 106 from the target 104 from the optical object 128. The wavefront sensor 132 transmits the detected wavefront information to the wavefront processor 134 for analysis. The wavefront processor 134 may determine the characteristics caused by the random screen 504. The analyzed wavefront information (corresponding to the characteristics caused by the random screen 504) is then transmitted from the wavefront processor 134 to the controller 136. The controller 136 may then control the deformable mirrors 510 and 518 to adjust the reflection of light to compensate for the turbulence experienced by the light 106 from the target 104.

Figure 5B:
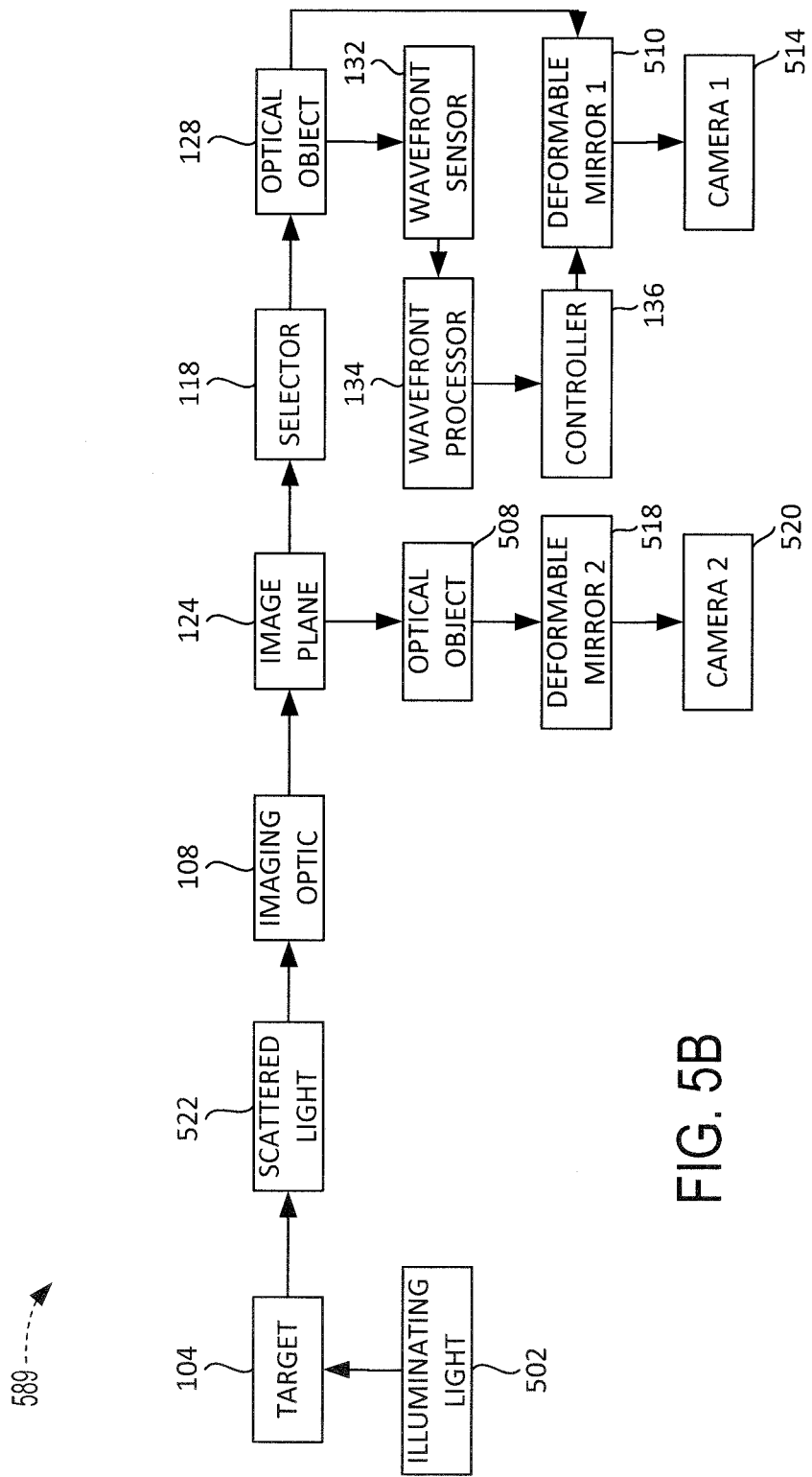
FIG. 5B is a block diagram illustrating an algorithm for correction of an image of a target using the system of FIG. 5A according to an embodiment of the present invention.

Referring to FIGS. 5A and 5B, an algorithm 589 for improving a resolution of image data of the target 104 detected by the system 500 is shown. Light from the light source 1150 is received at the target 104 and may illuminate the target 104. This light scatters off of a surface of the target 104 and is transmitted as light 106 towards the system 100. The scattered light 106 is received at the random screen 504 which introduces turbulence to the light 106 and results in scattered light 522. The scattered light 522 is received by the imaging optic 108. The imaging optic 108 focuses the light as an image 112 towards the selector 118.

The selector 118 is used to select a portion of the image 112 to be allowed to pass through the selector 118. The portion of the image allowed to pass through the selector 118 is referred to as the virtual beacon 126. The virtual beacon 126 is received by the optical object 128 where it is focused towards the wavefront sensor 132 for detection of features of the wavefront.

The wavefront processor 134 receives the detected wavefront features from the wavefront sensor 132. The wavefront processor 132 analyzes the detected wavefront features and can use the analysis to determine how to adjust for the turbulence simulated by the random screen 504. The wavefront processor 132 may then instruct the controller 136 to control the deformable mirror 510 and the deformable mirror 518 to adjust for the turbulence simulated by the random screen 504.

The deformable mirror 510 may reflect and scatter the image data corresponding to the virtual beacon 126 towards the camera 514. The reflection and scattering of the image data by the deformable mirror 510 may at least partially offset the effects of the turbulence simulated by the random screen 504, thus resulting in image data of a higher resolution than without use of the deformable mirror 510.

The lens 508 may perform a similar function as the optical object 128 and may focus a copy of the image 112 towards the deformable mirror 518. The deformable mirror 518 may reflect and scatter the copy of the image 112 towards the camera 520. The reflection and scattering of the image 112 by the deformable mirror 518 may at least partially offset the effects of the turbulence simulated by the random screen 504, thus resulting in image data of a higher resolution than without use of the deformable mirror 518.

Figure 6A:
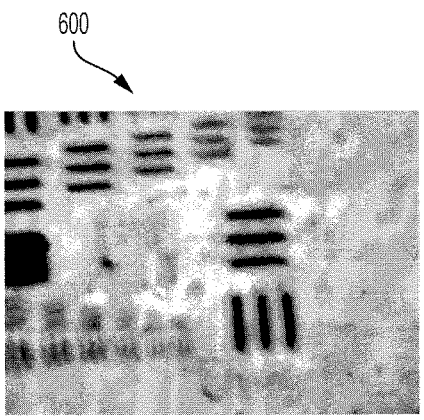
FIG. 6A is a picture illustrating image data detected using the system of FIG. 5A without use of adaptive optics and without use of the virtual beacon according to an embodiment of the present invention.
Figure 6B:
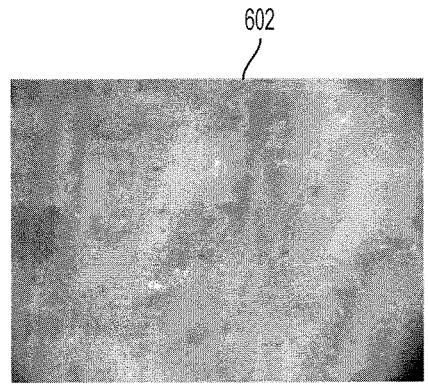
FIG. 6B is a picture illustrating image data detected using the system of FIG. 5A with adaptive optics in use and without use of the virtual beacon according to an embodiment of the present invention.

Referring to FIGS. 5A, 6A, and 6B, image data 600 corresponds to image data combined from the camera 514 and the camera 520 when the transparent portion 120 of the selector 118 is fully enlarged (i.e., the translucent portion 122 does not prevent any light from passing through the selector 118) and the deformable mirror 510 and the deformable mirror 518 are flat (not adjusting the light waves 130 or the image 112). Stated differently, the image data 600 is taken without selection of the virtual beacon and with adaptive optics off. Thus, the image data 600 corresponds to the light 106 from the target 104 as affected by the random screen 504 imitating turbulence.

Image data 602 corresponds to image data combined from the camera 514 and the camera 520 when the transparent portion 120 of the selector is fully enlarged and the controller 136 is controlling the deformable mirror 510 and the deformable mirror 518 based on the data detected by the wavefront sensor 132. Thus, the image data 602 was taken while the deformable mirror 510 and the deformable mirror 518 are controlled by the controller 136 based on light waves that have not been filtered as a virtual beacon. Stated differently, the image data 602 was taken without selection of a virtual beacon and with adaptive optics on.

As shown, the image data 600 lacks clarity but the shapes of the target 104 can be discerned. The image data 602, on the other hand, is sufficiently unclear that the shapes corresponding to the target 104 cannot be discerned. Thus, it is clear that the adaptive optics of the system 500 will not operate properly without filtering the virtual beacon 126 from the image 112 and that the wavefront data detected by the wavefront sensor 132 without use of the virtual beacon 126 is incorrect.

Figure 7A:
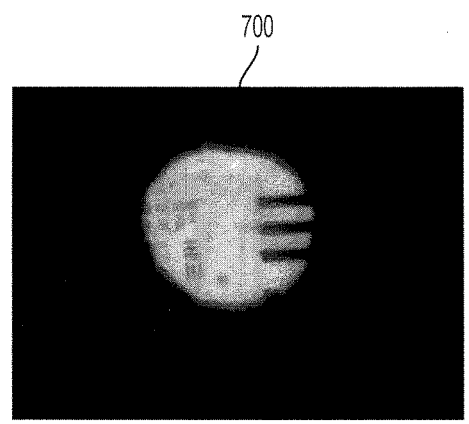
FIG. 7A is a picture illustrating image data corresponding to the virtual beacon of FIG. 5A using the system of FIG. 5A with adaptive optics and the virtual beacon in use according to an embodiment of the present invention.
Figure 7B:
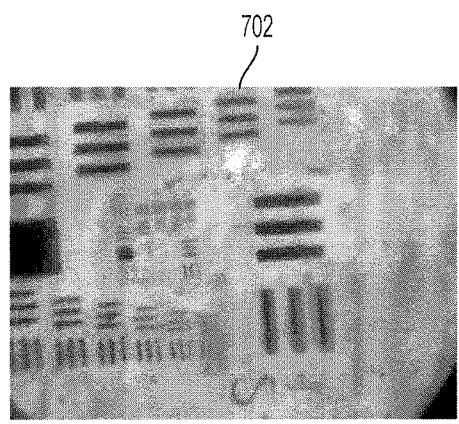
FIG. 7B is a picture illustrating image data corresponding to the target of FIG. 5A using the system of FIG. 5A with adaptive optics and the virtual beacon in use according to an embodiment of the present invention.

Referring now to FIGS. 5, 7A, and 7B, image data 700 corresponds to image data detected by the camera 514 when the transparent portion 120 of the selector 118 is narrowed to select the virtual beacon 126 (i.e., the translucent portion 122 prevents a portion of the image 112 from passing therethrough) and the deformable mirror 510 is controlled by the controller 136 based on the analysis of the virtual beacon 126 by the wavefront sensor 132. Thus, the image data 700 corresponds to a portion of the light 106 from the target 104 that is selected by the selector 118 as the virtual beacon 126 while the controller 136 is controlling the deformable mirror 510 based on the analyzed virtual beacon 126. Stated differently, the image data 700 was taken while a virtual beacon was selected and adaptive optics were on.

Image data 702 corresponds to image data detected by the camera 520 when the transparent portion 120 of the selector 118 is narrowed to select the virtual beacon 126 and the deformable mirror 518 is controlled by the controller 136. Stated differently, the system 500 was in the same state when both of the image data 700 and the image data 702 were detected. The image data 700 corresponds to a portion of the light 106 while the image data 702 may correspond to all of the light 106.

Referring now to FIGS. 5A-7B, it is clear that use of the selector 118 to select the virtual beacon 126 and use of the virtual beacon 126 can increase the image quality, or resolution, of light perturbed by a turbulent atmosphere. Stated differently, by reducing the area of the image allowed to pass through the selector 118 to select the virtual beacon 126, the light waves 130 received by the wavefront sensor 132 have optimal characteristics for use in adaptive optics.

Figure 8:
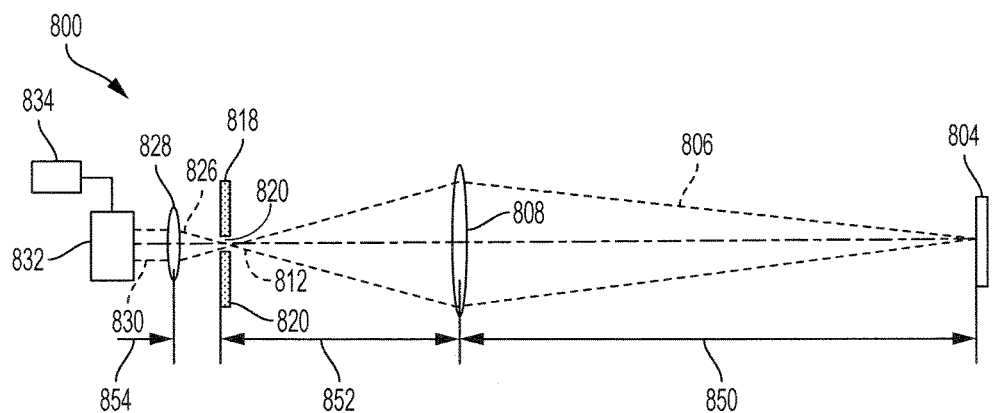
FIG. 8 is a schematic diagram illustrating features of a system for forming a virtual beacon and using the virtual beacon to calculate a distance from a portion of the system to a target according to an embodiment of the present invention.

Turning now to FIG. 8, a system 800 that is similar to the system 100 of FIG. 1A may be used to calculate a distance from the system 800 to a target 804. As described above, the radius of curvature of waves of light 806 received at an imaging optic 808 corresponds to a distance 850 between the imaging optic 808 and the target 804. This radius of curvature therefore allows a wavefront processor 834 to calculate the distance 850 from the imaging optic 808 to the target 804.

The light 806 from the target 804 will propagate through the atmosphere until it reaches the imaging optic 808. The imaging optic 808 then filters or focuses the light 806 as an image 812 towards a selector 818. A transparent portion 820 of the selector 818 allows a portion of the image 812 to pass through the selector 818 as a virtual beacon 826. The virtual beacon 826 is received by an optical object 828 where it is converted to light waves 830 that resemble the light 806 from the target 804. These light waves 830 are received by a wavefront sensor 832 where they are transmitted to the wavefront processor 834 for analysis.

The system 800 is designed such that the light waves 830 resemble the light 806 from the target 804. As described below, the design features of the system 800 result in the light waves 830 having a radius of curvature that corresponds to the radius of curvature of the light 806. Thus, the wavefront sensor 832 can detect the radius of curvature of the light waves 830 and the wavefront processor 834 can analyze the detected radius of curvature and determine the distance 850 between the imaging optic 808 and the target 804.

Figure 4:
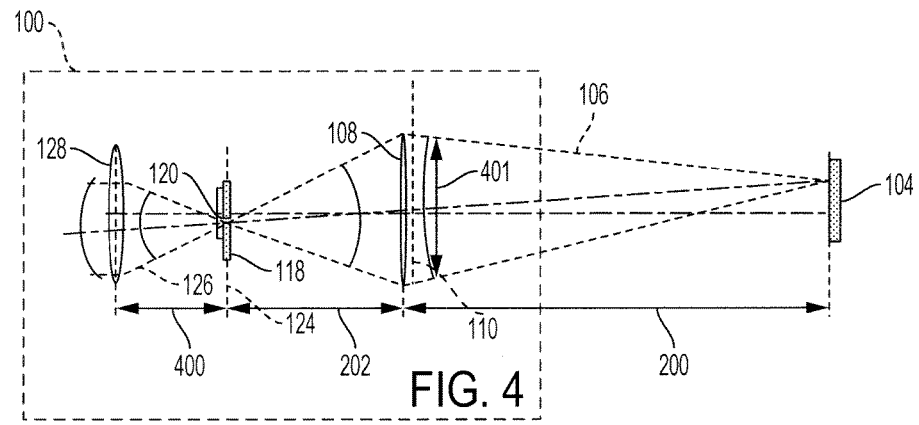
FIG. 4 is a schematic diagram illustrating operation of an optical object of the system of FIG. 1 according to an embodiment of the present invention.

With brief reference to FIGS. 4 and 8, the system 800 may utilize lenses having different focal lengths, and/or may include different distances between components, than the system 100. For example, the distance 854 between the optical object 828 and the selector 818 may be different than the distance 400 between the optical object 128 and the selector 118, and/or the focal length of the optical object 828 may be different than the focal length of the optical object 128. Returning reference to FIG. 8, performance of the system 800 may be provided by the following equation 7:

$$R = F + f - r \qquad \text{(eq. 7)}$$

where R corresponds to the distance 854, F corresponds to the focal length of the imaging optic 808, f corresponds to the focal length of the optical object 828, and r corresponds to the distance 852.

The measured radius of wavefront curvature ρm of the light waves 830 are related to the radius of wavefront curvature ρL of the light 806 received at the imaging optic 808 as shown by equation 8 below:

$$\rho_m = \rho_L \cdot f^2/F^2. \qquad (eq.\ 8)$$

Equation 8 illustrates that measured radius of the wavefront curvature $\rho_m$ of the light waves 830 is less than the radius of the wavefront curvature $\rho_L$ of the light 806 received at the imaging optic 808. The difference is determined by a ratio of a square of the focal length of the optical object 828 to a square of the focal length of the imaging optic 808. Because the measured radius of the wavefront curvature $\rho_m$ of the light waves 830 is less than the radius of the wavefront curvature $\rho_L$ of the light 806 received at the imaging optic 808, the measurement cycle for detecting the measured radius of the wavefront curvature $\rho_m$ of the light waves 830 is advantageously less than the measurement cycle for detecting the wavefront curvature $\rho_L$ of the light 806 received at the imaging optic 808.

Turning now to FIGS. 8-9C, test results of the system 800 are shown. FIG. 9A illustrates a map view of the system 800 and the target 804. As shown, the target 804 is illuminated by sunlight. Using a map program, such as Google Earth, the distance 850 between the system 800 and the target 804 was measured to be 1,200 meters (1,200 m, 3937 feet).

FIG. 9B illustrates a view 904 of the target 804 from the system 800 and FIG. 9C illustrates a magnified image 906 of the target 804. By calculating the radius of the wavefront curvature of the light waves 830 as detected by the wavefront sensor 832, the wavefront processor 834 calculated the distance 850 to be approximately 1,159 m plus or minus 20 m (3,802 feet plus or minus 65.6 feet). This result illustrates that the range finding capabilities of the system 800 is sufficiently precise for many situations. The system 800 provides significant advantages over other range finding systems. For example, the system 800 may be substantially smaller than many other range finding systems and may not unmask any monitoring of the target.

Turning now to FIGS. 8-10C, a graph 1000 illustrates intensity distribution detected by the wavefront sensor 832. In the experiments, a Shack-Hartmann wavefront sensor was used. A graph 1002 illustrates the wavefront of the light waves 830 corresponding to the restored virtual beacon 826. A graph 1004 illustrates the separated spherical component of the wavefront shown in the graph 1002 as used for calculating the distance 850.

Figure 11A:
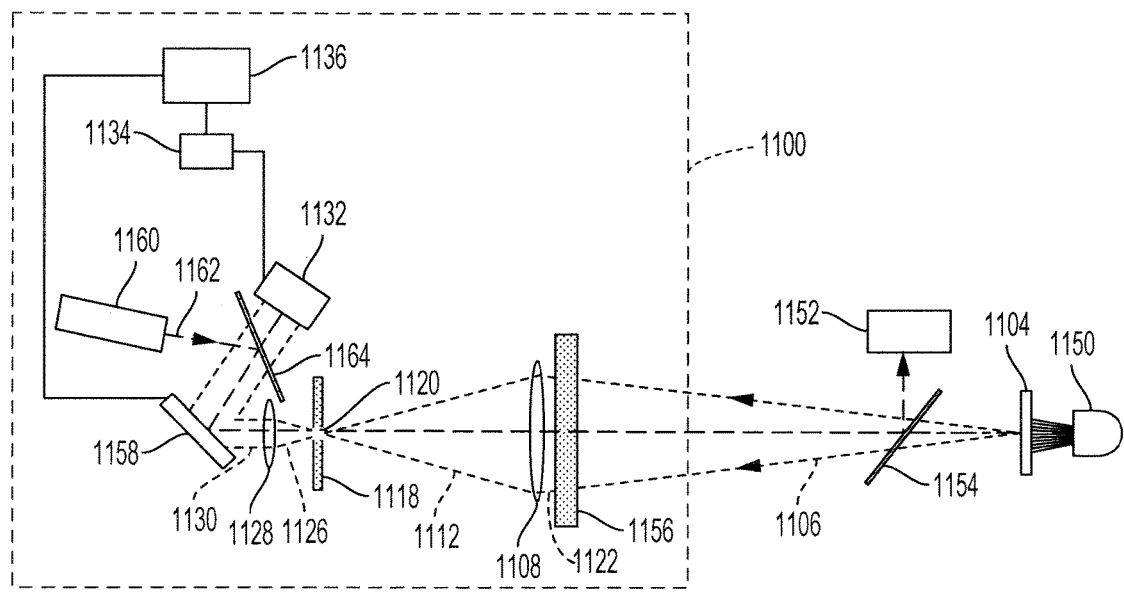
FIG. 11A is a schematic diagram illustrating features of a system for forming a virtual beacon and using the virtual beacon to increase a density of light energy of a laser beam at a desired location on a target according to an embodiment of the present invention.

Turning now to FIG. 11A, a system 1100 having similar components that have similar values as the system 100 of FIG. 1A may be used to increase an amount of light energy emitted from a laser 1160 received at a specific location on a target 1104. Stated differently, the system 1100 may decrease a radius of a laser beam 1162 received at the specific location on the target 1104. The system 1100 includes an LED 1154 illuminating the target 1104 with incoherent light. The system 1100 also includes an imaging optic 1108. The system 1100 also includes a random screen 1156 for simulating effects of turbulence in the atmosphere between the imaging optic 1108 and the target 1104. The system 1100 also includes a selector 1118 and an optical object 1128.

Light 1106 reflected or scattered by a surface of the target 1104 (i.e., light from the target 1104) is screened by the random screen 1156 and received by the imaging optic 1108 which refocuses the light into an image 1112 directed towards the selector 1108. A portion of the image 1112 is allowed to pass through a transparent portion 1120 of the selector 1118 to form a virtual beacon 1126. The optical object 1128 receives the virtual beacon 1126 and converts the virtual beacon 1126 into light waves 1130 that resemble the light 1106 from the target 1104.

The system 1100 also includes a wavefront sensor 1132 that detects features of the light waves 1130 and a wavefront processor 1134 that analyzes the detected wavefront features. The system 100 also includes a deformable mirror 1158 and a laser controller 1136 that receives the analysis of the detected wavefront features and controls the deformable mirror 1158 based on the analysis to compensate for the optical perturbations caused by the random screen 1156.

The system 1100 further includes the laser 1160 for outputting a laser beam 1162 and a beam splitter 1164 for allowing the laser beam 1162 to reflect off of the deformable mirror 1158 towards the target 1104. The laser controller 1136 controls the deformable mirror 158 such that the laser beam 1162 reflects off the deformable mirror 1158 in such a way that a greater amount of light energy from the laser beam 1162 is received at the target 1104 than if the laser beam 1162 were directed through the random screen 1156 without the controlled deformable mirror 1158. Stated differently, the deformable mirror 1158, as controlled by the laser controller 1136, reduces a radius of the laser beam 1162 where it is received at the target 1104.

Another beam splitter 1154 is positioned between the random screen 1156 and the target 1104. The beam splitter 1154 directs the laser beam 1162 towards a camera 1152 for determining the scattering of the light waves of the laser beam 1162. The camera 1152 can detect the beam intensity distribution of the laser beam 1162 after the laser beam 1162 passes through the random screen 1156. The camera 1152 is positioned in such a way as to receive the laser beam 1162 as if it were in the location of the target 1104.

Figure 11B:
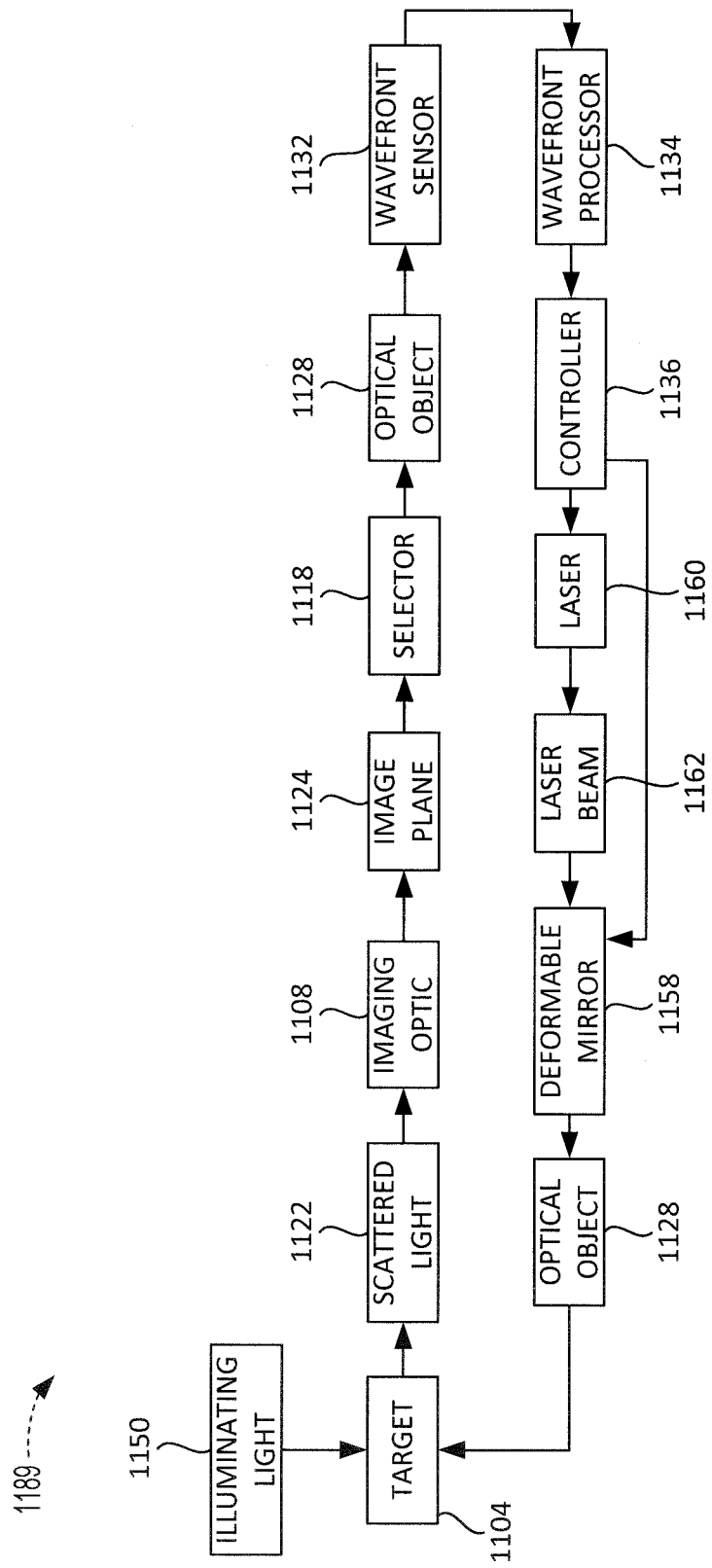
FIG. 11B is a block diagram illustrating an algorithm for increasing a density of light energy of a laser beam at a desired location on a target using the system of FIG. 11A according to an embodiment of the present invention.

Referring to FIGS. 11A and 11B, an algorithm 1189 illustrates use of the system 1100 to increase a focus of the laser beam 1162 on a desired portion of the target 1104. Stated differently, the algorithm 1189 can decrease a radius of the laser beam 1162 received at the target 1104. Light from the light source 1150 is received at the target 1104 and may illuminate the target 1104. This light scatters off of a surface of the target 1104 and is transmitted as light 1106 towards the system 1100. The scattered light 1106 is received at the random screen 1156 which introduces turbulence to the light 1106 and results in scattered light 1122. The scattered light 1122 is received by the imaging optic 1108. The imaging optic 1108 focuses the light as an image 1112 towards the selector 1118.

The selector 1118 is used to select a portion of the image 1112 to be allowed to pass through the selector 1118. The portion of the image allowed to pass through the selector 1118 is referred to as the virtual beacon 1126. The virtual beacon 1126 is received by the optical object 1128 where it is focused towards the deformable mirror 1158 and reflected or directed towards the wavefront sensor 1132 for detection of features of the wavefront.

The wavefront processor 1134 receives the detected wavefront features from the wavefront sensor 1132. The wavefront processor 1132 analyzes the detected wavefront features and can use the analysis to determine how to adjust for the turbulence simulated by the random screen 1156. The wavefront processor 1132 may then instruct the controller 1136 to control the deformable mirror 1158 to adjust for the turbulence simulated by the random screen 1156.

The laser 1160 outputs a laser beam 1162 towards the deformable mirror 1158. The laser beam 1162 is then redirected through the optical object 1128, the imaging optic 1108, and the random screen 1156 after which it is received at the target 1104. Because the deformable mirror 1158 has been controlled by the controller 1136 based on the analyzed detected wavefront features, the laser beam 1162 will have a greater focus at the desired location of the target 1104 than without use of the deformable mirror 1158. Stated differently, control of the deformable mirror 1158 based on the analyzed detected wavefront features results in the laser beam 1162 having a greater amount of light energy in a smaller area at the target then without use of the deformable mirror 1158.

Figure 12B:
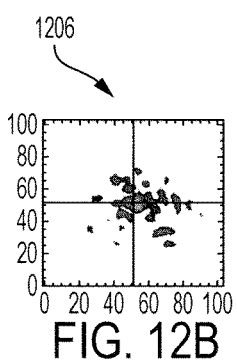
FIG. 12B is a graph illustrating a density of the light energy of the laser beam of FIG. 11A at the desired location on the target using the virtual beacon according to an embodiment of the present invention.
Figure 12A:
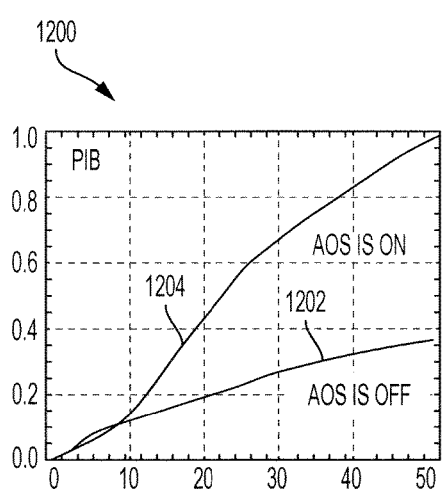
FIG. 12A is a graph illustrating a power-in-the-bucket of the laser beam of FIG. 11A at the desired location on the target both with use of the virtual beacon and without use of the virtual beacon according to an embodiment of the present invention.

Referring to FIGS. 11A and 12A, a graph 1200 shows power-in-the-bucket (PIB) values of the laser beam 1162 for various quantities of pixels that the camera 1152 can detect. A first line 1202 corresponds to the PIB values of the laser beam 1162 received at the camera 1152 when the adaptive optics are off (when the laser controller 1136 does not control the deformable mirror 1158 based on the analyzed wavefront data). A second line 1204 corresponds to the PIB values of the laser beam 1162 received at the camera 1152 when the adaptive optics are on (when the laser controller 1136 is controlling the deformable mirror 1158 based on the analyzed wavefront data). As can be seen in the graph 1200, use of the system 1100 to compensate for the turbulence simulated by the random screen 1156 results in more light energy being received at the desired location of the target 1104 than when the laser beam 1162 travels through the random screen 1156 without use of the virtual beacon 1126 based adaptive optics. In particular, the graph 1200 illustrates that approximately 90% of the total power of the laser beam 1162 is received at the particular location of the target 1104 when the adaptive optics of the system 1100 is on, and that approximately 30% of the total power of the laser beam 1162 is received at the particular location of the target 1104 when the adaptive optics of the system 1100 is off. Thus, FIG. 12A illustrates that the light energy from the laser 1162 is significantly more focused at the desired location when the adaptive optics is on (i.e., the laser beam 1162 has a smaller radius at the target 1104 when adaptive optics is on).

Figure 12C:
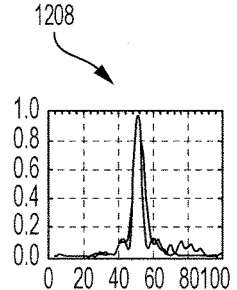
FIG. 12C is a graph illustrating the change of the density of the light energy shown in FIG. 12B along a horizontal line and a vertical line that pass through a center of the graph of FIG. 12B according to an embodiment of the present invention.
Figure 12D:
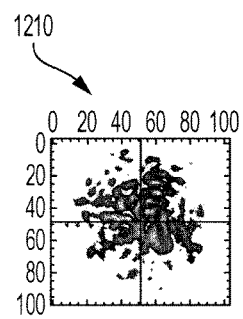
FIG. 12D is a graph illustrating a density of the light energy of the laser beam of FIG. 11A at the desired location on the target without use of the virtual beacon according to an embodiment of the present invention.
Figure 12E:
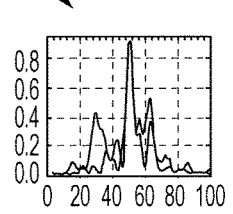
FIG. 12E is a graph illustrating the change of the density of the light energy of the laser beam shown in FIG. 12D along a horizontal line and a vertical line that pass through a center of the graph of FIG. 12D according to an embodiment of the present invention.

Referring to FIGS. 11A, 12B, and 12C, a graph 1206 visually illustrates the distribution of light from the laser beam 1162 received by the camera 1152 when the adaptive optics is on. Another graph 1208 is a light intensity diagram illustrating the intensity variations of light from the laser beam 1162 along the horizontal and vertical lines passing through the center of the graph 1206 when adaptive optics is on.

Referring now to FIGS. 11A through 12E, a graph 1210 visually illustrates the distribution of light from the laser beam 1162 received by the camera 1152 when the adaptive optics is off. Another graph 1212 is a light intensity diagram illustrating the intensity variations of light from the laser beam 1162 along the horizontal and vertical lines passing through the center of the graph 1206 when the adaptive optics is off.

As can be seen by comparing the graph 1206 and the graph 1208 to the graph 1210 and the graph 1212, use of the virtual beacon based adaptive optics of the system 1100 increases the concentration of light from the laser 1162 received at the desired location of the target 1104.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted.

What is claimed is:

1. A system for forming virtual beacons usable in wavefront sensing comprising:
    a first lens having a pupil plane and configured to receive light from a target and to form an image wave in an image plane;
    a selector positioned at the image plane and having a transparent window to allow a portion of the image wave created by the first lens to pass through the selector to form a virtual beacon wave, and an opaque area to prevent another portion of the image wave created by the first lens from passing through the selector; and
    a wavefront processor configured to receive a signal corresponding to the virtual beacon wave and to determine amplitude and phase information that corresponds to turbulence between the pupil plane of the first lens and the target based on the signal.

2. The system of claim 1 further comprising a second lens configured to receive the virtual beacon wave and to convert the virtual beacon wave to light waves in a plane conjugated to the pupil plane of the first lens.

3. The system of claim 2 further comprising a wavefront sensor configured to receive the light waves from the second lens and to detect wavefront features of the light waves converted from the virtual beacon wave.

4. The system of claim 3 wherein the wavefront sensor includes at least one of a Shack-Hartmann wavefront sensor or an interferometer and is configured to detect features of optical waves that arrived from the target to a pupil of the first lens and passed through the transparent window and the second lens.

5. The system of claim 3 wherein:
    the wavefront processor is configured to receive the signal from the wavefront sensor;
    the signal includes the detected wavefront features; and
    the wavefront processor is configured to determine the amplitude and phase information based on an analysis of the wavefront features.

6. The system of claim 5 further comprising:
    a laser configured to output a laser beam;
    a deformable mirror configured to receive the laser beam and to reflect the laser beam towards the target; and
    a mirror controller coupled to the wavefront processor and the deformable mirror and configured to control the deformable mirror to decrease a radius of the laser beam at a desired location of the target based on the analyzed detected wavefront features.

7. The system of claim 5 further comprising:
    a camera configured to detect image data;
    a third lens configured to receive the image output from the first lens and to output a target image that corresponds to the target;
    a deformable mirror configured to receive the target image and to reflect the target image towards the camera; and
    a mirror controller coupled to the deformable mirror and configured to control the deformable mirror to increase a resolution of the reflected target image detected by the camera based on the analyzed detected wavefront features.

8. The system of claim 5 wherein the detected wavefront features include a radius of curvature of the light waves and the wavefront processor is further configured to determine a distance from the first lens to the target based on the detected radius of curvature of the light waves.

9. The system of claim 1 wherein the selector further includes a second transparent window to allow a second portion of the image wave created by the first lens to pass through the second transparent window to form a second virtual beacon wave.

10. The system of claim 1 wherein the first lens includes at least one lens and can be represented by a first sub-lens having a focal length equal to a first distance between the first sub-lens and the target and outputs a planar wave, and a second sub-lens that receives the planar wave from the first sub-lens and focuses the planar wave on the image plane where the selector is located.

11. The system of claim 1 further comprising a diaphragm controller coupled to the selector and configured to adjust a size of the transparent window based on at least one of electronic feedback or user input to increase quality of the virtual beacon.

12. The system of claim 1 wherein the image wave created by the first lens is focused on the image plane.

13. A method for forming a virtual beacon for use in a wavefront sensing system comprising:
receiving, by a first lens, light waves from a target;
outputting, by the first lens, an image wave that is focused on an image plane;
allowing, by a transparent window of a selector located at the image plane, a portion of the image wave that was output by the first lens to pass through the selector, the portion of the image wave allowed to pass through the selector being a virtual beacon wave;
preventing, by an opaque portion of the selector, another portion of the image wave that was output by the first lens from passing through the selector;
receiving, by a wavefront processor, a signal corresponding to the virtual beacon wave; and
determining, by the wavefront processor, amplitude and phase information corresponding to turbulence between the first lens and the target based on the signal.

14. The method of claim 13 further comprising:
receiving, by a second lens, the virtual beacon wave;
outputting, by the second lens, light waves that emulate the portion of the image wave from the target that passed through the transparent window; and
detecting, by a wavefront sensor, wavefront features of the light waves output by the second lens.

15. The method of claim 14 further comprising:
outputting, by a laser, a laser beam; and
controlling, by a mirror controller, a deformable mirror in position to reflect the laser beam towards the target to decrease a radius of the laser beam that is received at a desired location of the target based on the amplitude and phase information.

16. The method of claim 14 further comprising:
receiving, by a third lens, the image wave output from the first lens;
outputting by the third lens, a target image that corresponds to the target;
reflecting, by a deformable mirror, the target image towards a camera; and
controlling, by a mirror controller, the deformable mirror to increase a resolution of the reflected target image based on the amplitude and phase information.

17. The method of claim 14 further comprising analyzing, by the wavefront processor coupled to the wavefront sensor, the detected wavefront features to determine a radius of curvature of the light waves and determining, by the wavefront processor, a distance from the first lens to the target based on the radius of curvature of the light waves.

18. A system for forming virtual beacons usable in wavefront sensing comprising:
an imaging optic including at least one lens positioned at a first distance from a target and configured to receive light from the target and to form an image wave of the target at an image plane;
a selector positioned at the image plane of the imaging optic and having an opaque portion and a transparent window to allow a portion of the image wave output by the imaging optic to pass through the selector to form a virtual beacon wave; and
a wavefront processor configured to receive a signal corresponding to the virtual beacon and to determine amplitude and phase information that corresponds to turbulence between the imaging optic and the target based on the signal.

19. The system of claim 18 further comprising:
an optical object including at least a second lens configured to receive the virtual beacon wave and to convert the virtual beacon wave to light waves that emulate the light from the target; and
a wavefront sensor configured to receive the light waves and to detect wavefront features of the light waves output by the optical object.

20. The system of claim 18 wherein the imaging optic can be represented by a first sub-lens having a focal length equal to the first distance between the first sub-lens and the target, and a second sub-lens that has a focal length equal to a distance between the second sub-lens and the image plane.

* * * * *